United States Patent Office 3,031,480
Patented Apr. 24, 1962

3,031,480
PROCESS FOR SIMULTANEOUS OXIDATION AND ESTERIFICATION OF UNSATURATED FATTY ACIDS
Gottfried Piekarski and Herbert Reinecke, Burghausen, Upper Bavaria, Germany, assignors to Wacker-Chemie G.m.b.H., Munich, Germany
No Drawing. Filed June 4, 1959, Ser. No. 818,013
Claims priority, application Germany June 7, 1958
8 Claims. (Cl. 260—405)

The present invention relates to an improved process for simultaneous oxidation and esterification of long chained unsaturated fatty acids containing 10 to 22 carbon atoms to produce products having an iodine number below 3 and epoxy-oxygen contents below 1% which are especially adapted as plasticizers and swelling agents for polymers and as emulsifiers after conversion to their ammonium or alkali metal salts.

According to the invention such oxidation and esterification is carried out at elevated temperatures with aqueous hydrogen peroxide, an oxygen transfer agent, such as acetic acid or acetic acid anhydride, and a strongly acid organic or inorganic oxygen compound of sulfur as the catalyst.

The quantity of catalyst employed according to the invention is between 1.5 and 8.5 g., preferably, 3.7–4.3 g., per mol of double bond of the unsaturated fatty acid. The designation mol of double bond of the unsaturated fatty acid is used herein as being equal to $$\frac{\text{Iodine number} \times \text{grams of unsaturated compound}}{254}$$

Too large a quantity of catalyst causes strongly exothermic and therefore difficultly controllable reaction peaks. When too low a quantity of catalyst is employed the reaction products produced have high iodine numbers and the reaction periods required are too long. When the reaction periods are too long, losses in active oxygen can occur and in addition yellowish or brownish discolored reaction products may be produced.

The strongly acid oxygen containing sulfur compound catalysts employed according to the invention, for example, can be sulfuric acid, ethyl sulfuric acid, p-toluene sulfonic acid or strongly acid sulfonated ion exchange resins, such as Amberlite JR–120, Duolite C–25, Dowex 5 OX and Permutit Q. Preferably, aqueous sulfuric acid (50% by weight) is employed as the catalyst.

The temperatures employed for the reaction according to the invention stand in close relation to the catalyst concentration. Temperatures between 40 and 95° C., preferably between 70 and 75° C., are employed for the oxidation and esterification reaction according to the invention. Temperatures which are too low lead to reaction periods which are too long and thereby engender losses of active oxygen. Furthermore, larger concentrations of non-reacted oxidizing agent may collect which can give rise to spontaneous oxidation reactions. Temperatures which are too high can lead to undesired side reactions to produce somewhat softer products which often may be weakly yellow colored.

Hydrogen peroxide, preferably about a 50% aqueous solution, is employed for the oxidation. With this concentration a uniform exothermic action is obtained. At least 1 mol of hydrogen peroxide should be employed per mol of double bond of the unsaturated fatty acid. Advantageously 1.3 to 1.5 mol of hydrogen peroxide is employed per mol of double bond in order to ensure an effective and thorough oxidation.

Glacial acetic acid is preferably employed as the oxygen transfer agent as in comparison to acetic acid anhydride smaller quantities suffice and further undesired side reactions, such as, too high a degree of acetylation, are avoided. About 0.5 to 0.6 mol of glacial acetic acid, preferably 0.56–0.57 mol, per mol of double bond of the unsaturated fatty acid suffice. However, higher quantities of glacial acetic acid, for example, 1 mol per mol of double bond, can also be employed, but the acetyl content of the reaction product will be correspondingly higher. Concentrations of glacial acetic acid which are too high can lead to very vigorous exothermic reactions.

The combined oxidation and esterification reaction according to the invention, in view of the high catalyst concentration employed, causes formation of higher molecular weight ester acids in addition to the dihydroxy and hydroxy-acetoxy acids. Therefore, it is possible by altering one or more of the reaction conditions within certain limits to produce products containing greater or lesser quantities of hydrophobic components and thereby modify the products obtained to suit the use to which they are to be put. On the other hand, when the process is carried out under the narrow limits given above, that is, at temperatures between 70–75° C. and catalyst concentrations between 3.7 and 4.3 g. per mol of double bond, reaction products of the same composition (iodine number, acid and saponification number, acetyl content and the like) are always obtained from the same starting material. The reproducible products thus obtained because of their optimal ratio of hydrophilic to hydrophobic groups are suitable as emulsifiers for most purposes. For example, the ammonium salt of the oxidation and esterification product of an unsaturated fatty acid has considerably better emulsifying properties than the salts of the corresponding saturated acid or the corresponding hydroxy, dihydroxy, hydroxy-acetoxy or epoxy compound.

According to the invention the hydrogen peroxide preferably is first added comparatively rapidly to the reaction mixture and then more slowly when the double bond concentration decreases. It is also possible to add the hydrogen peroxide dropwise during a main reaction period and then to stop the addition of hydrogen peroxide for some time and then again add the remainder of the hydrogen peroxide dropwise (usually about 10–20% of the total amount). Preferably, the addition of the hydrogen peroxide is controlled in such a way that larger concentrations of hydrogen peroxide and peracetic acid, preferably not over 2% by weight based upon the reaction mixture are avoided during the entire reaction. It is possible thereby to provide a uniform and not too strongly exothermic oxidation reaction during the entire addition of the hydrogen peroxide.

A further advantage of the process according to the invention is that the use of organic solvents is not necessary, although not precluded, during the oxidation and during the purification. It is only necessary that care be taken to provide a thorough mixture of individual components.

The purification of the reaction product obtained according to the invention is very simple, namely, by washing with distilled water at 40 to 80° C., preferably about 65° C., until the pH of the effluent water reaches a constant pH of 4.7–5.0. The use of too high a temperature during such washing is not recommended, as losses of organic material through solution can occur. The aqueous and oily layers are easily separated from each other and with care almost quantitative yields of the oxidation and esterification products can be obtained based upon the starting unsaturated fatty acid. The water content of the washed products amounts to about 10 to 13% by weight. If a dry product is required, the washed product can be easily dried under vacuum at moderately elevated temperatures up to about 80° C. However, for the preparation of emulsifiers, such drying is usually not necessary.

A noteworthy property of the oxidation and esterification products produced according to the invention is that they dissolve to a clear solution in cold aqueous alkali metal hydroxide or dilute aqueous ammonia at a pH of 8, whereas the salts of epoxy fatty acid are only slightly insoluble in warm water (see Chemical Abstracts 1954, 48, 12428). It is therefore particularly significant that with the process according to the invention the epoxy oxygen content of the product does not exceed 1%. In general, only about 0.1% epoxy oxygen is found in the products produced according to the invention.

The process according to the invention is applicable to the long chained unsaturated fatty acids containing 10 to 22 carbon atoms, such as undecylenic acid, oleic acid, linoleic acid, linolenic acid, ricinoleic acid and the like. The mixtures of unsaturated fatty acids obtained in the saponification of unsaturated vegetable oils can also be used as the starting material. Conjugated double bonds are only oxidized incompletely and require a larger excess of hydrogen peroxide and longer reaction periods. A very effective oxidation and esterification product can, for example, be obtained from oleic acid which is commercially available in sufficient purity.

The process according to the invention, for example, can be carried out in a reaction vessel containing the acid to be oxidized provided with a stirrer, heating and cooling means, a thermometer, a reflux condenser and means for regulated dropwise addition of hydrogen peroxide. Preferably, the vessel is clad with acid resistant material and the valves are of stainless steel, type 316. The supply conduits for the hydrogen peroxide preferably are of glass or polyethylene. The glacial acetic acid or acetic acid or acetic acid anhydride is added with moderate stirring and then the contents of the vessel are heated to 45–50° C. and the catalyst or catalyst solution added in 2–3 minutes while stirring. The mixture is then heated to 65° C. and the dropwise addition of the aqueous hydrogen peroxide begun with thorough stirring of the reaction mixture. Expediently the addition of the aqueous hydrogen peroxide is through a tube which opens up below the surface of the liquid reaction mixture. The rate at which the hydrogen peroxide is added and therefore also the period of time over which it is added naturally depends upon the size of the batch to be reacted. Already about 5–10 minutes after starting the addition of hydrogen peroxide, a slow exothermic reaction can be observed and such reaction only begins to diminish towards the end of the hydrogen peroxide addition. The optimal reaction temperature is easily controlled. After all of the hydrogen peroxide has been added, the reaction mixture is maintained at the same temperature for several hours until analysis of a sample of the reaction mixture indicates a hydrogen peroxide concentration below 0.7% by weight based upon the reaction mixture. In the liquid state, the reaction product has a light yellow color and after washing out and cooling forms a waxlike, almost solid, scarcely colored mass. The washing is carried out at the temperature indicated above and about double the volume of water based upon the reaction mixture is required. The water is added and the mixture thoroughly stirred for about five minutes and the mixture then permitted to stand about 10 to 15 minutes to permit formation of easily separable layers of the organic and aqueous phases. In general such washing must be repeated about 10–12 times to reach a constant pH in the wash water.

The oxidation and esterification products obtained according to the invention can, for example, be used to improve the properties of synthetic resins, for instance, as a swelling agent for low pressure polyethylene (see Italian Patent No. 569,844, of April 4, 1957). They also can, after conversion to the corresponding ammonium or alkali metal salts, be used as emulsifying agents. In addition, the ester acids can, after conversion to salts of metals of groups II to IV of the periodic system, be employed for improving and stabilizing low pressure polyethylene (German published application 1,028,331 of April 17, 1958).

The following examples illustrate a number of embodiments of the process according to the invention.

*Example 1*

250 g. of technical oleic acid (0.885 mol double bond, iodine No. 89.6, acid number 200, freezing point 4° C.) were placed in a 500 cc. flask provided with a stirrer, thermometer, reflux condenser and a dropping funnel and dissolved in 30 g. of glacial acetic acid (0.5 mol:0.57 mol per mol of double bond) while stirring. The mixture was then heated to 45° C. and mixed with 7 g. of 50% by weight aqueous sulfuric acid (3.96 g. catalyst per mol of double bond). Such sulfuric acid addition was over a period of 3 minutes. After the mixture had been heated to 70° C., 72 g. of 50% hydrogen peroxide were added dropwise over a period of one hour while stirring the reaction mixture well. The reaction mixture was maintained at 73–75° C. by periodic cooling. The reaction mixture was stirred further for a period of 20 minutes and a further 14.4 g. of the 50% hydrogen peroxide added over a period of 10 minutes. The total quantity of aqueous hydrogen peroxide, namely, 86.4 g. amounted to 1.43 mol of hydrogen peroxide per mol of double bond. Up to this point the reaction was still weakly exothermic and it was only necessary to supply heat during the further stirring for 1½ hours to continue the reaction at 73–75° C. At this point, that is, after a total reaction period of three hours, only 0.85% by weight of hydrogen peroxide and 0.4% by weight of peracetic acid were found in the reaction mixture. After stirring for a further hour at 73° C. the quantities of hydrogen peroxide and peracetic acid present had been reduced by 0.55 and 0.25% by weight.

After washing with distilled water at 65° C., 251 g. of an almost white product with a water content of 10.5% by weight were recovered.

A sample was dried and analysed. The analysis values found were:

Iodine number_____ 1
Acid number_____ 164.6
Saponification number_____ 200.0
Acetyl content_____percent__ 1.51
Epoxy oxygen_____do____ 0.1
M.P. _____(clear melt)__ 63° C.
Active oxygen not present.

*Example 2*

36 kg. of technical oleic acid (the same quality as used in Example 1, 126 mol double bond) were mixed with 4.32 kg. of glacial acetic acid (72 mol, 0.57 mol per mol of double bond) and were stirred together in an enameled 100 liter vessel until a homogeneous solution resulted. Then 1.01 kg. of 50% by weight sulfuric acid (4.01 g. catalyst per mol of double bond) were stirred in at 50° C. The mixture was then immediately heated to 65° C. and the dropwise addition of 50% aqueous hydrogen peroxide begun with vigorous stirring. The velocity at which the hydrogen peroxide was added was such that 118.5 g. of the 50% hydrogen peroxide per minute were added during the first 15 minutes and the velocity was then gradually diminished so that at the end of the period of addition of 2 hours and 45 minutes it was only 54 g. per minute. The total quantity of 50% hydrogen peroxide added was 12.392 kg. (1.45 mol per mol of double bond). A reaction temperature between 72 and 74° C. was maintained by cooling the reaction vessel. The oxidation reaction was uniformly exothermic during the addition of the hydrogen peroxide. The reaction mixture was then maintained while moderately stirring at 70° C. for a further 3½ hours. After this period the hydrogen peroxide and peracetic acid content of the reaction mixture had dropped to 0.6% and 0.3% by weight respectively.

After purification with distilled water, as indicated above, 40 kg. of a waxlike almost white product with a 12% water content was obtained.

An analysis of a dried sample gave the following values:

| | |
|---|---|
| Iodine number | 2 |
| Acid number | 162 |
| Saponification number | 198 |
| Acetyl content percent | 1.6 |
| Epoxy oxygen do | 0.1 |
| M.P. (clear melt) | 65° C. |

When 4 times the above quantity of oleic acid, that is, 144 kg., was analogously oxidized in a correspondingly larger vessel, a subsequent heating period of 4½ hours was required after a 3¼ hour period of addition of hydrogen peroxide (during which again the quantity of peroxide added per unit of time was continuously reduced). The values obtained upon analysis of the purified oxidation product thus obtained are substantially in agreement with those above and in Example 1 with only slight variations.

*Example 3*

250 g. of undecylenic acid (1.36 mol of double bond; iodine No. 138; acid number 303; M.P. 23° C.) were mixed with 46.1 g. of glacial acetic acid (0.77 mol, 0.565 mol per mol of double bond) in a vessel as described in Example 1. The solution was then mixed after heating to 50° C. with 10.9 g. of 50% by weight of sulfuric acid (4.0 g. catalyst per mol of double bond) and immediately heated to 70° C. A total of 134 g. of 50% hydrogen peroxide (1.45 mol per mol of double bond) were added dropwise to the stirred reaction mixture over a period of 1 hour. The temperature of the reaction mixture was maintained at 74° C. by periodic cooling. After the addition of the hydrogen peroxide was completed, the mixture was stirred for a further two hours at 70° C. and at the conclusion of this period the hydrogen peroxide and peracetic acid content had dropped below 0.6%.

After purification with distilled water, 239 g. of a white solid product containing 11% of water were obtained.

An analysis of a dried sample gave the following values:

| | |
|---|---|
| Iodine number | 2.6 |
| Acid number | 245 |
| Saponification number | 291 |
| Acetyl content percent | 1.55 |
| Epoxy oxygen do | 0.4 |
| M.P. (clear melt) | 45° C. |

Active oxygen was not present.

The procedure of Example 1 was repeated except that 7 g. of p-toluene sulfonic acid (7.9 g. catalyst per mol of double bond) was employed as the catalyst instead of the sulfuric acid. The reaction was only weakly exothermic and it was necessary to supply heat 25 minutes after the addition of hydrogen peroxide was started. After a 7 hours' reaction period the content of hydrogen peroxide in the reaction mixture had dropped to 0.47% by weight. After purification with distilled water at 65° C., 245 g. of a light yellow mass containing 10% by weight of water were obtained.

An analysis of a dried sample gave the following values:

| | |
|---|---|
| Iodine number | 2.9 |
| Acid number | 165.5 |
| Saponification number | 194.5 |
| Acetyl content percent | 0.98 |
| Epoxy oxygen do | 0.06 |
| M.P. (clear melt) | 55° C. |

Active oxygen was not present.

*Example 5*

The procedure of Example 1 was repeated except that 10 g. of a strongly acid sulfonated ion exchange resin (Amberlite IR 120) was employed as the catalyst. Care was taken to secure thorough mixture of the reaction mixture. The reaction was again exothermic but was easy to control. Almost all of the hydrogen peroxide was used up after a 10 hours' reaction period at 73–75° C. The recovery of the reaction product from the reaction mixture did not offer any particular difficulties, as the solid catalyst could be removed from the organic material with a copious quantity of water. 240 g. of a waxlike almost white product containing 9% by weight of water were obtained. An analysis of a dried sample gave the following values:

| | |
|---|---|
| Iodine number | 2.5 |
| Acid number | 161.2 |
| Saponification number | 193 |
| Acetyl content percent | 0.70 |
| Epoxy oxygen do | 0.13 |
| M.P. (clear melt) | 60° C. |

Active oxygen was not present.

*Example 6*

The procedure of Example 1 was repeated except that 45 g. of acetic acid anhydride (0.44 mol, 0.49 mol per mol of double bond) were employed as the oxygen transfer agent instead of acetic acid. The mixture was stirred for 30 minutes at 45° C. before the catalyst was added. The catalyst was added over a period of 5 minutes. Thereafter, the procedure was the same as in Example 1. The total period of the reaction was 5 hours.

243 g. of a weakly yellow waxlike product containing 11% by weight of water were obtained. An analysis of a dried sample gave the following values:

| | |
|---|---|
| Iodine number | 1.7 |
| Acid number | 166.5 |
| Saponification number | 235 |
| Acetyl content percent | 4.5 |
| Epoxy oxygen do | 0.42 |
| M.P. (clear melt) | 57° C. |

Active oxygen was not present.

We claim:
1. A process for the production of ester acids having an iodine number below 3 and an epoxy oxygen content below 1%, which comprises reacting a long chained unsaturated fatty acid containing 10 to 22 carbon atoms with hydrogen peroxide in the presence of acetic acid and an esterification catalyst selected from the group consisting of sulfuric and sulfonic acids at a temperature between 70 and 85° C., the quantity of hydrogen peroxide being at least 1 mol per mol of double bond of such unsaturated fatty acid, the quantity of acetic acid being between about 0.5 and 1 mol per mol of double bond of such unsaturated fatty acid and the quantity of esterification catalyst being 1.5 g. to 8.5 g. per mol of double bond of such unsaturated fatty acid.

2. The process of claim 1 in which said esterification catalyst is sulfuric acid.

3. The process of claim 1 in which said esterification catalyst is p-toluene sulfonic acid.

4. The process of claim 1 in which said esterification catalyst is a strongly acid sulfonated ion exchange resin.

5. The process of claim 1 in which the concentration of hydrogen peroxide and any peracetic acid produced therefrom is maintained below 2% during the entire reaction.

6. The process of claim 1 comprising in addition washing the ester acids produced with distilled water at a temperature between 40 and 80° C.

7. A process for the production of ester acids having an iodine number below 3 and an epoxy oxygen content below 1%, which comprises reacting a long chained unsaturated fatty acid containing 10 to 22 carbon atoms with hydrogen peroxide in the presence of acetic acid and sulfuric acid at a temperature between 70 and 95° C., the quantity of hydrogen peroxide being at least 1 mol per mol of double bond of such unsaturated fatty acid, the quantity of acetic acid being 0.5 to 0.6 mol per mol of double bond of such unsaturated fatty acid, and the quantity of sulfuric acid being 1.5 to 8.5 g. per mol of double bond of such unsaturated fatty acid.

8. A process for the production of ester acids having an iodine number below 3 and an epoxy oxygen content below 0.5, which comprises reacting a long chained unsaturated fatty acid containing 10 to 22 carbon atoms with hydrogen peroxide in the presence of acetic acid and sulfuric acid at a temperature between 70 and 75° C., the quantity of hydrogen peroxide being 1.3 to 1.5 mol per mol of double bond of such unsaturated fatty acid, the quantity of acetic acid being 0.56 to 0.57 mol per mol of double bond of such unsaturated fatty acid, and the quantity of sulfuric acid being 3.7 to 4.3 g. per mol of double bond of such unsaturated fatty acid.

References Cited in the file of this patent

UNITED STATES PATENTS

| | | |
|---|---|---|
| 2,443,280 | Swern et al. | June 15, 1948 |
| 2,801,253 | Greenspan et al. | July 30, 1957 |
| 2,847,433 | Ohlson et al. | Aug. 12, 1958 |

FOREIGN PATENTS

| | | |
|---|---|---|
| 805,367 | Great Britain | Dec. 3, 1958 |
| 1,035,641 | Germany | Aug. 7, 1958 |

OTHER REFERENCES

Chem. & Eng. News, page 557, Feb. 21, 1949.